Feb. 9, 1971 N. VLAEMINCK 3,562,745

SIGNAL TRANSMISSION SYSTEM WITH A VARIABLE LEVEL CLIPPING CIRCUIT

Filed Jan. 29, 1968

INVENTOR.
NOEL VLAEMINCK

BY Bernard E. Franz

ATTY.

United States Patent Office 3,562,745
Patented Feb. 9, 1971

3,562,745

SIGNAL TRANSMISSION SYSTEM WITH A VARIABLE LEVEL CLIPPING CIRCUIT

Noel Vlaeminck, Antwerp, Belgium, assignor to Automatic Electric Laboratories, Inc., Northlake, Ill., a corporation of Delaware Filed Jan. 29, 1968, Ser. No. 701,264
Int. Cl. G08b *1/00*
U.S. Cl. 340—351 7 Claims

ABSTRACT OF THE DISCLOSURE

A multifrequency signaling system transmitter having a circuit to clip the multifrequency pulse data signals at a variable level to minimize transients generated upon switching signal sources on and off the transmission line. The clipping level is determined by the voltage applied across a pair of diodes by an exponentially varying voltage of charging or discharging capacitors, varying from a completely short-circuited state when the diodes are conducting in series, to the maximum value of the signal when the diodes are non-conductive. The charging or discharging of these capacitors is controlled by a pair of transistors that are switched by an external circuit applying the signal to the line.

BACKGROUND OF THE INVENTION

Field of the invention

This invention relates to an electronic multifrequency signaling system and more particularly to a multifrequency transmitter including means for switching the signal frequency generators on and off the transmission line.

Description of the prior art

In multifrequency signaling systems digital or other information is transmitted in the form of pulses each comprising a combination of two or more frequencies selected from a plurality of available frequencies in accordance with the information to be conveyed. For example, the value of a decimal digit may be transmitted by means of a single pulse comprising a unique combination of two frequencies chosen from an available group of six frequencies in accordance with a so-called two-out-of-six code. These signaling systems, for which the frequencies employed are commonly within the voice frequency range, but may be in other ranges, are for convenience called multiple-frequency pulse signaling systems. It should be appreciated that the multiple frequencies are those constituting the pulses and do not refer to the pulse repetition rate.

This type of multiple frequency pulse signaling system using voice frequencies is sometimes employed for transmitting via a voice frequency transmission path to a remote register, during the process of setting up a telephone connection, digital information which relates to the number of a called or calling party or to a route between switching centers involved in the connection. Thus, when a trunk connection or other voice frequency transmission path has been established to a register at a remote location and this fact has been signaled by, say some form of line signaling equipment, then a manually operated keyset or an automatic sender may bring about, as in already known telephone systems employing multifrequency signaling, the transmission of digital signals each in the form of a pulse comprising a combination of voice frequencies according to a particular code.

In the known systems, the sources which provide the frequencies constituting a particular signal are applied in parallel to the transmission path through an isolating network. A receiver at the register location includes a common limiting amplifier feeding a number of frequency detectors, of which there is one tuned to each of the signaling frequencies. Each frequency detector comprises a narrow bandpass filter, a rectifying circuit, and a relay which is actuable from its normal unoperated condition to its operated condition on detection of the frequency to which the detector is tuned. This type of operation, however, is troubled with the transients that are generated when a relatively high voltage signal is switched onto a transmission line. Being used to convey digital information, such signals must be received without error, and transients generated by the sudden application of these signals influence the receiving filters, other than those that are to respond to the transmitted signal, and can cause an erroneous response.

SUMMARY OF THE INVENTION

The multifrequency transmitter according to the invention gradually impresses the signal upon the line and then slowly removes it therefrom, and thus minimizes the transients generated during this switching operation.

This is accomplished by connecting a pair of clipping diodes to the line and then controlling the level at which the clipping occurs by a resistance-capacitance network. The rate of change of the clipping level is determined by the resistor and capacitor constants of the network. The charged or discharged condition of the network is determined by a pair of transistors which respond to an external control.

BRIEF DESCRIPTION OF THE DRAWING

The novel features which are believed to be characteristic of the invention both as to its organization and method of operation will be more apparent from the following detailed description, taken in conjunction with the drawing, in which.

Figure 1:
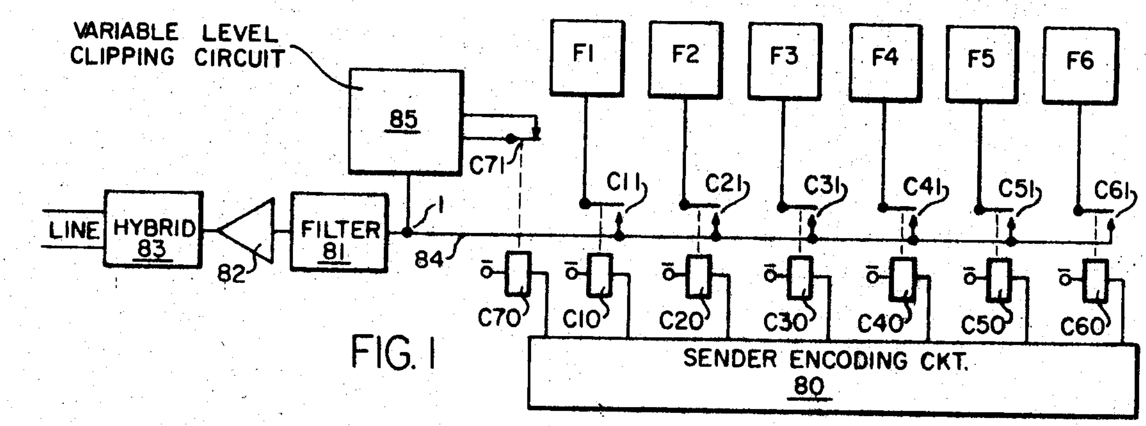
FIG. 1 is a simplified block diagram of a multifrequency transmitter according to the invention.

The illustration of FIG. 1 shows only those portions of a multifrequency sender system as are required for an understanding of the novel system having a variable level clipping circuit. The signal frequency generators are shown as blocks designated F1 through F6. A corresponding group of relays C10 through C60 are shown to control the contacts C11 through C61 for applying the respective frequencies to the line 1. These relays are under the control of a sender encoding circuit 80 which, in turn, is controlled by common control equipment (not shown). Relays C10 through C60 function to apply the associated frequencies through the filter 81, amplifier 82 and a hybrid circuit 83 to the transmission line, as well as perform other necessary functions of the signaling operation. These functions could include the operation of contacts connected to a control circuit for checking the two-out-of-six code, and for switching out matching resistors that are used to match the transmission equipment when no sending is taking place. To insure that the frequency signals upon application to the line 1 do not produce undesirable transients, circuit 85 is connected at this point. This circuit operates to gradually increase the signal to its full value and then to attenuate it completely, when it is required to remove it from the line.

Figure 2:
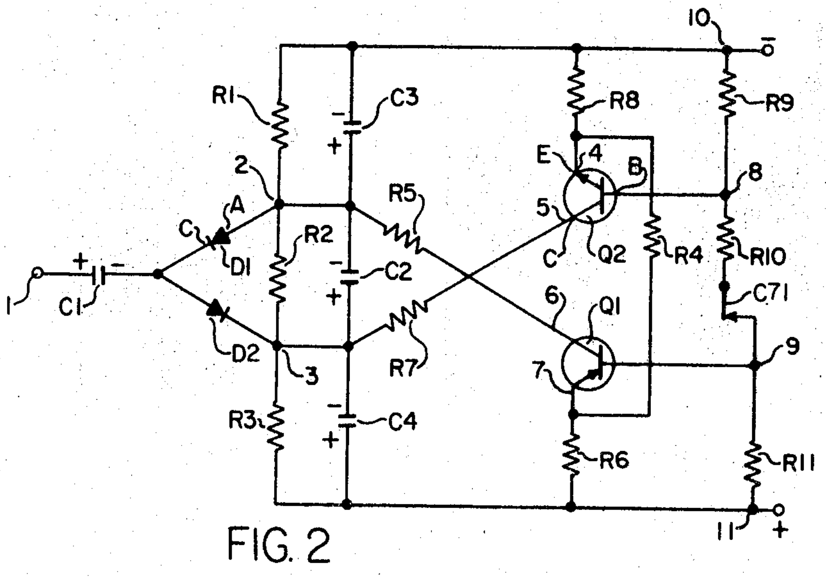
FIG. 2 is a schematic of the preferred embodiment of the clipping circuit of the invention.

The selected pair of frequencies for a particular code are applied by the operation of the relays C10 through C60 which operate their associated contacts C11 through C61 to apply the corresponding frequency generators output to a common conductor 84. Conductor 84 conducts the applied signal through filter 81, designed to pass only frequencies within a certain band of frequencies, an amplifier 82 to bring the signal strength up to the desired level, and hybrid 83 to apply the amplified and filtered signal to the line for transmission to its destination. However, whenever any of the relays C10 through C60 is operated, relay C70 is also operated to open its associated contacts C71. Operation of contacts C71 initiates a shift in operation of the variable level clipping circuit 85, which when contacts C71 are closed, is operative to shunt out any signal appearing at point 1 on conductor 84. Thus, as the clipping level is being increased by circuit 85, the level of the signal is also progressively increased to its maximum level. When transmission of the signal is to cease, relay C70 is first released, closing contacts C71 to in turn control the variable level clipping circuit 85 to slowly decrease the clipping level and thus remove the signal from the line, after which time any of the operated relays C10 through C60 are released and the sender is prepared to transmit the next code. The variable level clipping circuit 85 is controlled by contacts C71 to exercise its clipping functions at terminal 1. These contacts and terminal correspond to the contacts and terminal marked with the same designations in FIG. 2. FIG. 2 is a schematic of the circuit within block 85.

Briefly, the circuit of FIG. 2 comprises its clipping diodes D1 and D2 coupled through capacitor C1 to terminal 1, clipping level determining voltage divider resistors and associated capacitors C2, C3 and C4, and discharge switching transistors Q1 and Q2 which are controlled by contacts C71.

Considering first the switching elements of the circuit, transistors Q1 and Q2 of the PNP and NPN type, respectively, are so connected in the circuit by associated biasing resistors as to have two basic operating states, either fully conductive or nonconductive, determined by opening and closing respectively of contacts C71. The emitter of Q1 is connected to a source of positive potential at terminal 11 through resistor R6, while the emitter of Q2 is connected to a source of negative potential at terminal 10 through resistor R8. A resistor R4 connected to both emitter terminals completes a voltage divider bias arrangement, to maintain the respective emitters at the proper relative voltages during their non-conductive states.

The collector of transistor Q1 is connected to the negative voltage source through resistors R5 and R1. The collector of the transistor Q2 is connected to the positive voltage source through resistors R7 and R3.

A capacitor C3 is connected across resistor R1, and similarly, a capacitor C4 is shunted across resistor R3. Connected between the terminals of resistors R1 and R3 away from the respective voltage source terminals, marked 2 and 3, respectively, is a parallel combination of resistor R2 and capacitor C2. Capacitors C2, C3 and C4 together with resistors R1, R2 and R3 comprise the resistor-capacitor circuit for controlling the slope of the clipping rate. A pair of diodes D1 and D2 are serially connected in that order between terminals 2 and 3, with the anode of D1 connected to terminal 2 and the cathode of D2 connected to terminal 3. Terminal 2 is also connected to the junction of resistor R5 and capacitor C3. Similarly, terminal 3 is connected to the junction of resistor R7 with capacitor C4. The junction between diodes D1 and D2 is coupled through capacitor C1 to terminal 1, the point at which the signal whose amplitude is to be modified is connected. This diode limiting or clipping circuit is used to limit the peak-to-peak voltage of a waveform to a given amplitude. In this circuit the diodes are in parallel with the frequency signal generating input circuits F1 through F6 shown in FIG. 1 and operate to conduct when the peak input voltage exceeds a given biasing voltage level on the diodes. This biasing voltage is that supplied by the charge on the capacitors C2, C3 and C4.

Also connected across the voltage source in series from the negative terminal 10 to the positive terminal 11 are resistor R9, resistor R10, break contacts C71 and resistor R11 and one of the break contacts C71 is connected to to the base of transistor Q2, while the junction 9 of resistor R11 and one of the break contacts C71 is connected to the base of Q1. With contacts C71 closed as shown, the transistors Q1 and Q2 are biased to be fully conductive. Thus, transistor Q1 serves to conduct away any charge on capacitors C2 and C4 while transistor Q2 conducts away the charge that appears on capacitors C2 and C3. Upon the opening of the contacts C71, the two transistors are switched to a non-conductive state to permit the capacitors to again start to charge at a rate determined by the resistors R1, R2 and R3.

An operative embodiment of the circuit illustrated in FIG. 2 has been constructed and successfully operated with the following component values and a voltage supply of 24 v.:

| | | |
|---|---|---|
| Resistors R1 and R3 | ohms | 1,000 |
| Resistor R2 | do | 3,000 |
| Resistor R4 | do | 2,200 |
| Resistors R5 and R7 | do | 470 |
| Resistors R6 and R8 | do | 22 |
| Resistors R9 and R11 | do | 5,000 |
| Resistor R10 | do | 10,000 |
| Capacitor C1 | mf | 25 |
| Capacitors C2, C3 and C4 | mf | 5 |
| Transistor Q1 | | 2N1377 |
| Transistor Q2 | | 2N388A |
| Diodes D1 and D2 (mfg. Belge de Lamps Elect.) | | QA5 |

Figure 3:
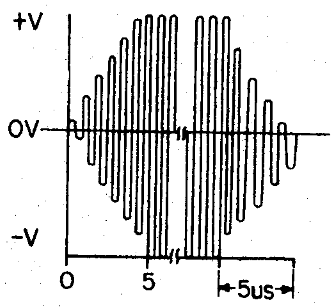
FIGS. 3 and 4 are waveforms showing the effect of this circuit upon the signals impressed upon the line.
Figure 4:
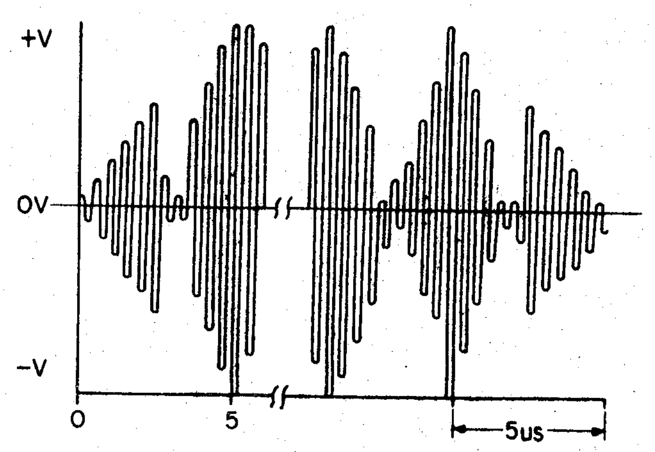

With the above values the circuit of FIG. 2 functioned to vary the signal in 5 milliseconds from no signal to the operating level, as well as from the operating level to no signal. FIG. 3 is a drawing of an oscilloscope trace when a single frequency of 1980 Hz. is applied to the line and shows the effects of the variable clipping level circuit upon the signal. The trace of FIG. 4 is that of an actual signal having 1860 Hz. and 1980 Hz. components. A beating effect is evident and somewhat obscures the variable clipping effect at the start and termination of the trace.

It will be apparent that applicant has provided an improved multifrequency signaling transmission system utilizing a clipping level circuit in which the level of clipping is varied by means of the changing bias provided by the RC circuit and its assocated charge and discharge control means, to thereby gradually apply and remove a signal code to the transmission means. Various changes and alternative implementations will now occur to those skilled in the art without departing from the true spirit and scope of the invention. Accordingly, it is not intended that the invention be limited to that which has been particularly shown and described except as such limitations appear in the appended claims.

What is claimed is:

1. An alternating current signaling system comprising: signal frequency generating means, switching means operative to couple said signal frequency generating means to a signal transmission conductor, control means connected to operate said switching means, a variable voltage limiting circuit and means connected to operate it upon coupling of said signal frequency generating means to said signal conductor to control the level of the signal to progressively increase from zero to its full value, and to progressively decrease said frequency signal level during the removal thereof from said signal conductor, thereby minimizing the generation of transient electrical noise from the sudden application or removal of a signal to the line.

2. Apparatus according to claim 1 including a plurality of signal frequency generating means and a corresponding plurality of switching means operative to couple said respective signal frequency generating means to said signal conductor, said control means further operative to select particular ones of said frequency generating means, and to operate said switching means to couple said selected corresponding frequency generating means to said signal conductor, whereby a multifrequency signal is applied to said signal conductor.

3. Apparatus according to claim 1 wherein said variable voltage limiting circuit comprises a pair of diodes in a series cathode-to-anode connection with the junction of said diodes connected to said signal transmission conductor, a resistor-capacitor bias network connected to each of said diodes and a discharge means operated upon coupling said frequency generating means to said signal conductor to discharge said capacitors via said associated resistors to thereby bias said diodes to a non-conductive state whereby the signal level is progressively increased to its full value.

4. Apparatus according to claim 3 including a plurality of signal frequency generating means and a corresponding plurality of switching means operative to couple said respective signal frequency generating means to said signal conductor, said control means further operative to select particular ones of said frequency generating means, and to operate said switching means to couple said selected corresponding frequency generating means to said signal conductor, whereby a multifrequency signal is applied to said signal conductor.

5. Apparatus in accordance with claim 3, wherein said resistor-capacitor bias network comprises: a first, a second and a third resistor connected in series across the negative and positive terminals of a voltage source, a first, a second and a third capacitor connected in shunt of said respective resistors, said first and said second diodes' remaining poles connected to the junctions of said first and second, and said second and third resistors respectively, whereby said capacitors will charge to their maximum voltage and said diodes remain biased in a non-conducting state, a first controlled shorting means connected from the negative terminal of said voltage source and said remaining pole of said second diode, and a second controlled shorting circuit connected from the positive terminal of said voltage source and said remaining pole of said first diode with a common control switch means for both said shorting circuits, said shorting circuits operated in response to said control means to short said first, second and third capacitors whereby said diodes are progressively placed in a fully conductive state as the capacitors become discharged.

6. Apparatus in accordance with claim 5, wherein said first controlled shorting means includes a first NPN transistor with the emitter connected to the negative terminal of the voltage source and the collector connected to said remaining pole of said second diode, and said second controlled shortening means includes a second PNP transistor with the emitter connected to the positive terminal of the voltage source and the collector connected to said remaining pole of said first diode, fourth, fifth and sixth resistors connected in series across the negative and positive terminals of said voltage source, the base of said first transistor connected to the junction of said fourth and fifth resistors, the base of said second transistor connected to the junction of said fifth and sixth resistors and a common control switch means in series between said fourth and sixth resistors, said transistors biased in response to the operation of said common control switch means to become fully conductive to short said first, second and third capacitors whereby said diodes are progressively placed in a full conductive state as the capacitors become discharged, to thereby decrease the signal at said input terminal.

7. Apparatus in accordance with claim 5, wherein said variable voltage limiting circuit further includes, in said first controlled shorting means, a first NPN transistor with the emitter connected to the negative terminal of the voltage source via a first resistor of a voltage divider network terminal, and the collector connected to said remaining pole of said second diode via a first resistor of a discharge path, and said second controlled shorting means includes a second PNP transistor with the emitter connected to the positive terminal of the voltage source via a second voltage divider network and the collector connected to said remaining pole of said first diode via a second resistor of a discharge path, and a third resistor of a voltage divider network connecting the emitters of both said transistors to maintain said transistor bias during the non-conductive period of said transistor, said transistor biased in response to the closing of said common control switch means to become fully conductive to short said first, second and third capacitors whereby said diodes are progressively placed in a fully conductive state as the capacitors become discharged, to thereby decrease the signal level at said input terminal.

References Cited

UNITED STATES PATENTS 2,733,433 1/1956 Morrison ---------- 340—351

THOMAS B. HABECKER, Primary Examiner

U.S. Cl. X.R.

178—66; 307—237